United States Patent [19]
Bomback et al.

[11] Patent Number: 5,317,922
[45] Date of Patent: Jun. 7, 1994

[54] CAPACITANCE TRANSDUCER ARTICLE AND METHOD OF FABRICATION

[75] Inventors: John L. Bomback, Plymouth; Ronald C. Elder, Detroit; Shaun L. McCarthy, Ann Arbor, all of Mich.

[73] Assignee: Ford Motor Company, Dearborn, Mich.

[21] Appl. No.: 876,168

[22] Filed: Apr. 30, 1992

[51] Int. Cl.$^5$ .............................. G01L 7/08; G01L 9/12
[52] U.S. Cl. ................................. 73/724; 29/25.41; 73/718; 361/283.3
[58] Field of Search ............... 73/718, 724; 29/25.41; 361/283

[56] References Cited
U.S. PATENT DOCUMENTS

| | | | |
|---|---|---|---|
| 4,287,553 | 9/1981 | Braunlech | 361/283 |
| 4,420,790 | 12/1983 | Golke et al. | 361/283 |
| 4,612,599 | 9/1986 | Ziegler | 73/724 |
| 4,825,335 | 4/1989 | Wilner | 73/718 |
| 4,838,088 | 6/1989 | Murakami | 73/724 |
| 5,022,270 | 6/1991 | Rud, Jr. | 73/718 |

*Primary Examiner*—Donald Woodiel
*Attorney, Agent, or Firm*—Allan Lippa; Roger L. May

[57] ABSTRACT

A capacitance transducer has a first hermetically sealed cavity adapted to deform in response to an applied force, such as pressure or acceleration, and a second hermetically sealed cavity adapted to resist deformation in response to such applied force. The cavities are formed between two doped silicon layers separated by a selectively etched electrically insulating spacer layer. Multiple medial electrically insulating cavity area spacer segments within the second cavity resist deformation thereof in response to the applied force to be measured. The capacitance transducer can be manufactured from doped silicon wafers using well developed silicon wafer processing techniques.

13 Claims, 5 Drawing Sheets

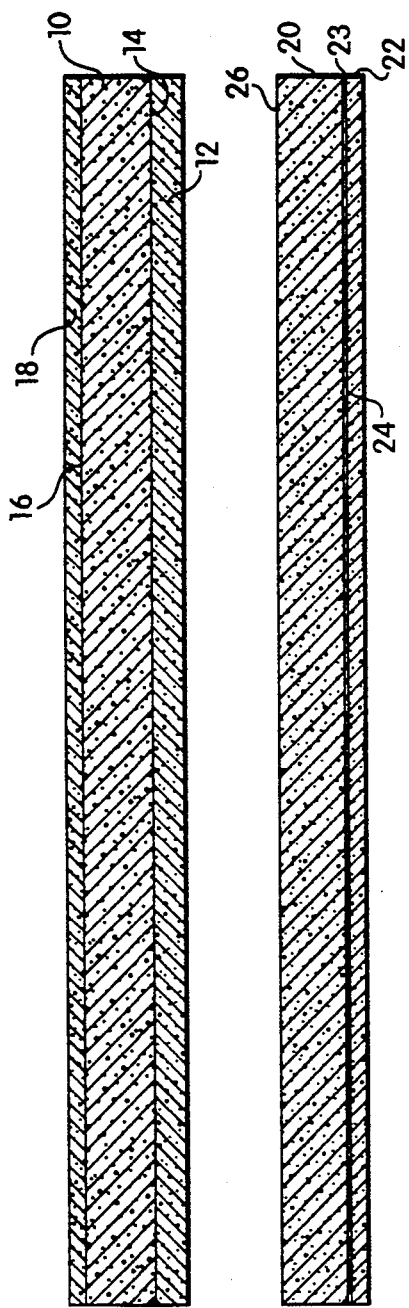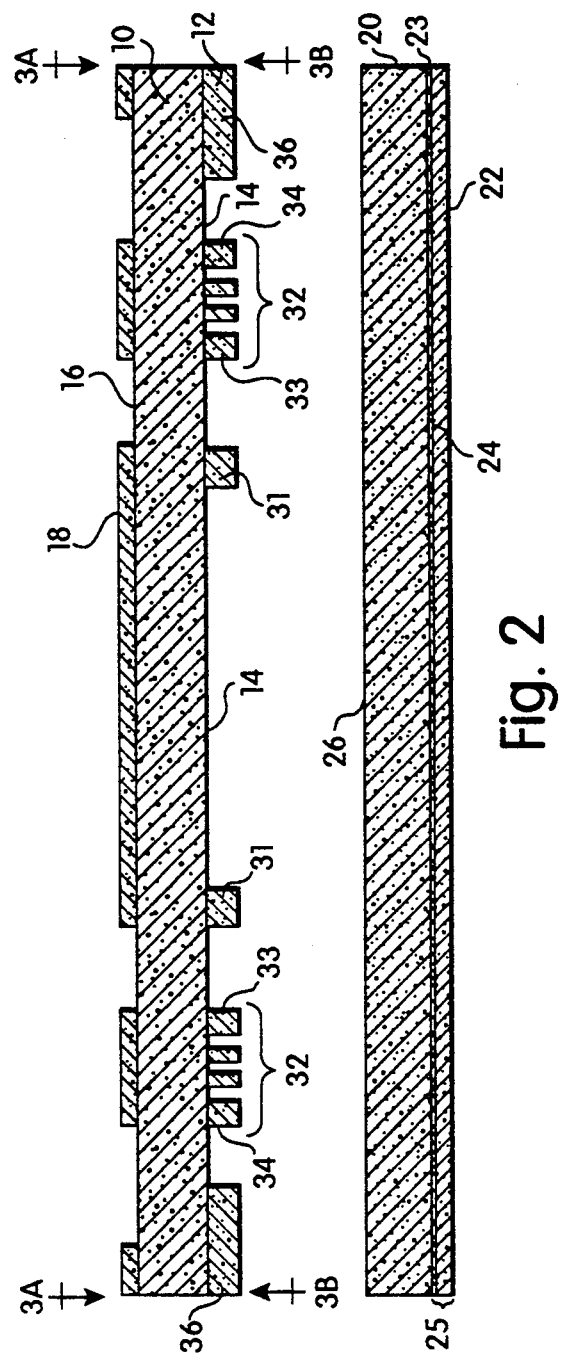
Fig. 1
Fig. 2

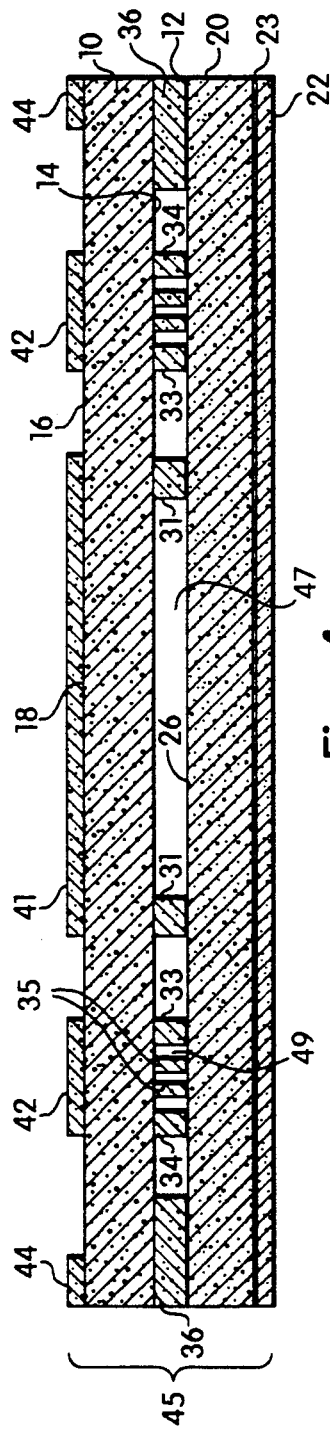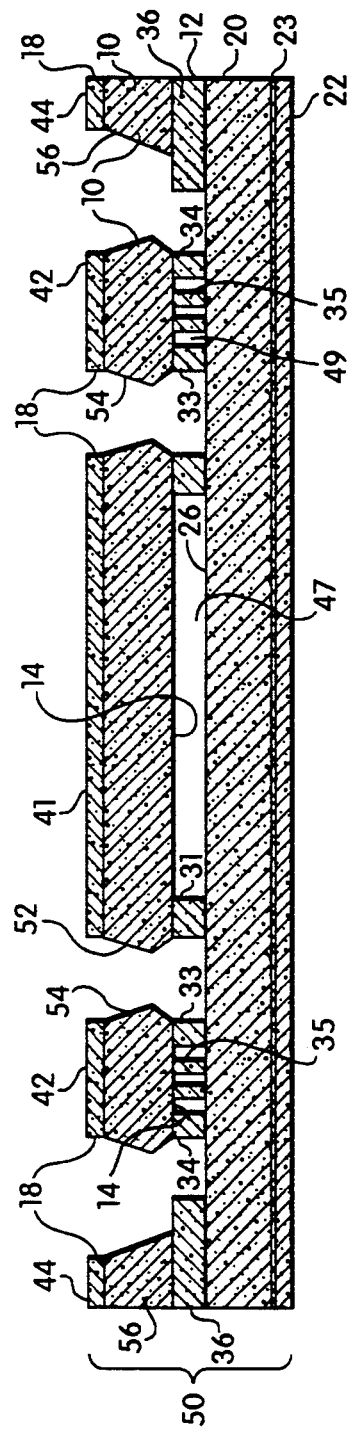

CAPACITANCE TRANSDUCER ARTICLE AND METHOD OF FABRICATION

FIELD OF THE INVENTION

This invention relates to variable semiconductor capacitance transducers, and in particular to capacitance transducers having a first sensor transducer adapted to respond to an applied force, such as pressure or acceleration, and an integrated reference transducer adapted to be less responsive to the applied force.

BACKGROUND OF THE INVENTION

Variable capacitance semiconductor transducers with built-in reference capacitors have been constructed and used, for example, to sense pressure variations, acceleration forces and the like. Parallel plate capacitors are known wherein one plate is formed of a semiconductor material and the other plate is a dielectric, such as quartz. Generally, oppositely disposed surface areas of the respective plates are metalized to provide the conductive regions of the capacitor. Doping the semiconductor plate with a high impurity concentration has also been utilized to form a conductive region in the semiconductor capacitor plate. Typically, the semiconductor plate includes a thin diaphragm portion which deflects in response to the applied force, such as a pressure differential across it.

The accuracy of such semiconductor pressure transducers, especially in the microbar pressure range, is adversely effected by changes in capacitance due to thermal effects and other environmental conditions acting on the transducer additional to the force to be measured. Temperature changes cause variation in plate separation due to thermal expansion or contraction of the material acting as a spacer between the plates. Plate area is also varied by thermal expansion and contraction of the plates. These variations in plate separation and area are sometimes called thermal offset. Temperature changes may also cause deflection of the sensor diaphragm due to creation of stress within the diaphragm parallel to the surface of the plates.

Correction of these thermal effects, for example, by calibration or selection of dielectric material having a coefficient of thermal expansion similar to that of the semiconductor material, is expensive and time consuming and often not entirely effective. The accuracy and utility of a capacitive transducer can be enhanced if the thermal effects are distinguished from the effects of the pressure or other force being measured. A variable capacitance transducer is shown in U.S. Pat. No. 4,420,790 to Golke et al for measuring pressure variations, having an integrated semiconductor reference capacitance transducer. An epitaxial layer on the surface of a silicon substrate wafer forms a diaphragm over an aperture through the silicon wafer. A second similar area of the epitaxial layer is positioned over an area of the silicon substrate wafer having no such aperture. Thus, the second, reference transducer is not responsive to environmental pressure. By comparing the capacitance of the two transducers, the thermal and other effects which deform the reference transducer can be distinguished from the effects of the environmental pressure deforming the primary transducer.

The Golke patent suggests that in prior semiconductor transducers, thermal stress was almost totally due to the use of an upper plate of dielectric material having a different coefficient of thermal expansion from that of the lower semiconductor plate. The Golke device employs silicon wafers for both the upper and lower plate. The principle and reference transducers of the Golke device have a common upper plate of monocrystalline silicon doped with N+impurities to provide electrical conductivity. The gap between the upper plate and the two lower plates of the transducers is determined by the aggregate thickness of a number of stacked films plus eight polysilicon stops. The polysilicon stops are secured to a passivation layer on the upper plate by a thin film technique, such as vacuum deposition. Golke notes that the stops are preferably all of the same height to ensure an equal separation between the plates and the two transducers. There is a recognized need to ensure the uniformity of the spacing between the plates of transducer devices of this type, having reference transducers integrated with a primary transducer.

SUMMARY OF THE INVENTION

In accordance with the present invention, a capacitance transducer has an hermetically sealed cavity, generally acting as a primary transducer, adapted to deform and respond to an applied force, such as, environmental pressure, acceleration, etc. The cavity is formed between a first doped silicon member and a doped silicon substrate separated by a selectively etched electrically insulating spacer layer. The selectively etched spacer layer forms an electrically insulating cavity perimeter spacer of predetermined thickness. A second cavity, generally acting as a reference transducer, is formed between a second doped silicon member and the doped silicon substrate, again separated by a selectively etched electrically insulating spacer layer. The selectively etched spacer layer forms a cavity perimeter and, in addition, forms multiple medial electrically insulating cavity area spacer segments within the perimeter. The medial spacer segments resist deflection of the second cavity. The doped silicon substrate of the two cavities can be surface area portions of the same doped silicon wafer. The upper surfaces of the two transducers can be metalized, electrically isolated from each other, and electrically connected via mounting means to associated circuitry.

In the method aspect of the invention equal cavity spacing (the gap between the doped silicon member and the doped silicon substitute) is achieved with excellent precision for the primary sensor transducer and the reference sensor transducer by selectively etching away portions of an electrically insulating layer formed on a surface of a doped silicon wafer. The portion of the electrically insulating layer remaining on the surface of the doped silicon wafer forms the electrically insulating spacer for defining the cavities. A bonded assembly can be formed by bonding a second doped silicon wafer to the first doped silicon wafer, sandwiching the etched electrically insulating layer between them. Thus, two hermetically sealed cavities are formed, each having a spacing or gap equal to the other with excellent precision. The bonded assembly can then be anisotropically etched to define separate doped silicon members corresponding to the first transducer, the reference transducer, and, preferably, a substrate support, each separate from the others on a common doped silicon substrate.

In one aspect, an electrically conductive metalization layer is deposited on the upper surface of the three doped silicon members, with the metalization layer on the substrate support member extending to electrical contact with the doped silicon substrate. The resulting component can be mounted to a base member, making electrical contact between the metalization layer on each of the three portions of the component with corresponding electrical leads of the base member for interconnection with associated circuitry, optionally also mounted on the base member.

Those skilled in the art will recognize from the foregoing disclosure and from the following more detailed description of certain preferred embodiments that they present a significant advance in the art. A capacitance transducer article with a built-in reference transducer is provided having capacitor gap dimensions defined by well-known and precisely controllable film deposition and etch techniques. It can be fabricated, including the formation of electrically distinct circuit nodes (for the primary transducer, the reference transducer, and the substrate support) without a lithographic mask step. In addition, numerous embodiments of the capacitive transducer article can be readily fabricated using standard integrated circuit batch processing steps and techniques. Furthermore, preferred embodiments are easily scaleable over large pressure ranges, for example, forming pressure transducers for pressure ranges in millibars or hundreds of psi. These and additional features and advantages will be better understood from the following detailed description.

BRIEF DESCRIPTION OF THE DRAWINGS

FIGS. 1-7 illustrate capacitance transducer articles and method steps in accordance with a preferred embodiment of the present invention, with FIG. 7 being a cross-sectional side elevation view of a mountable capacitive transducer article.

Figure 3A:
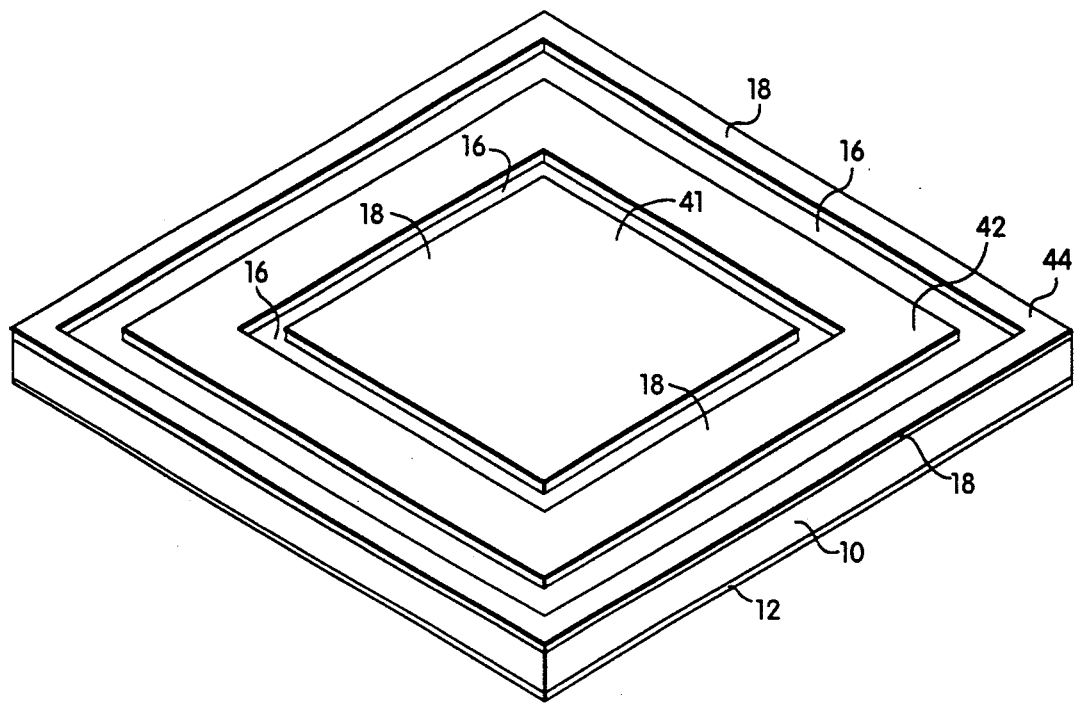

Those skilled in the art will recognize that the drawings are not necessarily to scale, with certain films and coatings being shown having exaggerated thickness for clarity of illustration.

DETAILED DESCRIPTION OF CERTAIN PREFERRED EMBODIMENTS

In the discussion below and in the claims which follow it should be understood that all directional terms including, for example, references to an upper or lower surface of a component, are used for convenience and correspond generally to the orientation illustrated in the drawings. Such terms are not meant to limit the invention to any particular configuration or to use in any particular orientation.

Referring now to FIGS. 1-7, a first doped silicon wafer 10 has an electrically insulating layer 12 of predetermined thickness on a lower surface 14. Such layer may be grown thereon using well known techniques. Doped silicon wafer 10 preferably is one of multiple identical units in a standard silicon wafer of 4 to 8 inch diameter and about 20 mils thickness. Preferably, the wafer is a single crystal silicon wafer to facilitate precise configuration and dimension control in subsequent anisotropic etching, as described below. The silicon wafer should be highly doped, most preferably having substantially uniform dopant level throughout. It may be either N type doped silicon, for example phosphorous doped silicon, or P type doped silicon, for example boron doped silicon. For numerous typical transducer applications, the silicon wafer will preferably be doped at a level of $10^{17}$ to $10^{19}$/cc for suitable electrical conductivity.

The electrically insulating layer 12 is deposited or grown to the thickness desired for the cavity gap, typically 2 to 5 microns. It can be produced as a thermal oxide, for example by exposing the silicon wafer 10 to steam, which is preferred in certain embodiments since it is relatively cost efficient. It can be a sputtered oxide, for example silicon dioxide, which is preferred in certain embodiments since it is commercially well known and widely used. It can be a sputtered glass, such as boro-silicate glass, which is preferred in certain applications in view of its thermal expansion being close to that of silicon. Alternatively, the electrical insulating layer can be provided as a low temperature oxide, such as a deposited silicon oxide produced by reacting a silane with oxygen in a low pressure reactor.

The upper surface 16 of silicon wafer 10 preferably has a protective layer 18 which most preferably is silicon nitride or the like produced, for example, by single-sided low pressure deposition in a low pressure reactor by plasma enhanced chemical vapor deposition. Such protective layer provides protection during subsequent anisotropic etching of the silicon wafer 10.

A second silicon wafer 20 is provided, preferably being substantially identical to the first silicon wafer 10. Optionally, however, it need only be highly doped for suitable electrical conductivity at its upper surface 26 for a depth of a few microns. As illustrated, lower silicon wafer 20 has a protective coating 25 on its lower surface 24 consisting of nitride deposition layer 22 overlying oxide layer 23. The nitride deposition layer 22 preferably is about 0.2 microns thick. It can be produced according to known plasma deposition techniques. Typically, in plasma deposition the silicon wafer sits on a surface and only one side is coated. If an alternative nitride deposition method is used, for example, low pressure reactor deposition, such that the entire surface of the second silicon wafer 20 is coated, then the nitride deposition should be removed from upper surface 26 of wafer 20. The optional oxide layer 23 can be produced, for example, by thermally oxidizing the surface, such as by exposing the surface 24 to steam in a furnace. The oxide layer 23 provides protection for the silicon wafer 20 during the silicon nitride deposition. Those skilled in the art will recognize that in certain applications it may be easier to oxidize the wafer and subsequently remove the oxide from upper surface 26, for example, by buffered hydrofluoric acid. The oxide layer preferably is about 0.1 micron thick for typical applications.

An etch pattern is formed on both sides of upper silicon wafer 10. Specifically, the electrically insulating layer 12 on lower surface of wafer 10 is masked and etched and the protective layer 18 on upper surface 16 of wafer 10 is correspondingly masked and etched to define two capacitor cavity structures 30, 32. In the preferred embodiment illustrated in the drawings (see especially FIGS. 3A and 3B), a first capacitor cavity structure 30 comprises a picture frame segment 31 of the original electrically insulating layer 12 on the lower surface 14 of wafer 10. The second capacitor cavity structure 32 surrounds first capacitor cavity structure 30, the two preferably being equal in open area (later to be cavity area). As will be more fully understood from the discussions below, picture frame segment 31 of layer 12 will serve as a first electrically insulating cavity perimeter spacer of predetermined thickness (the thickness of deposited layer 12) between a corresponding first region of a doped silicon substrate formed of the lower wafer 20 and a first doped silicon member formed from the upper wafer 10. Together, these elements will form the cavity of a first sensor transducer means of the finished capacitance transducer article.

Similarly, the second capacitor cavity structure 32 comprises a second electrically insulating cavity perimeter spacer having the same predetermined thickness. This second spacer consists of inner perimeter spacer segment 33 and outer perimeter spacer segment 34. More specifically, the continuous strip of material 33 defines an inside perimeter of the cavity and the continuous strip 34 defines the outside perimeter of the cavity. Together with a corresponding second region of the doped silicon substrate formed of wafer 20 and a second doped silicon member formed from the upper wafer 10, the inner and outer perimeter spacer segments form the cavity of a second sensor transducer means in the capacitance transducer article. Such second cavity is substantially concentric and coplanar with the first cavity, being radially outward thereof in the form of an endless channel surrounding the first cavity. In alternative embodiments, for example embodiments wherein the second cavity is side-by-side with the first cavity, the second cavity perimeter spacer may consist of a single perimeter spacer segment, preferably being substantially like the first perimeter spacer.

Thus, in accordance with this preferred fabrication aspect, the capacitor gap dimensions are defined by highly reliable and routine thin film depositions and etch, rather than, for example, anisotropic etching of silicon cavities as has been used in producing conventional silicon pressure sensors. This novel processing aspect also provides (together with additional steps discussed below) three electrically isolated circuit nodes without a lithographic mask step.

Figure 3B:
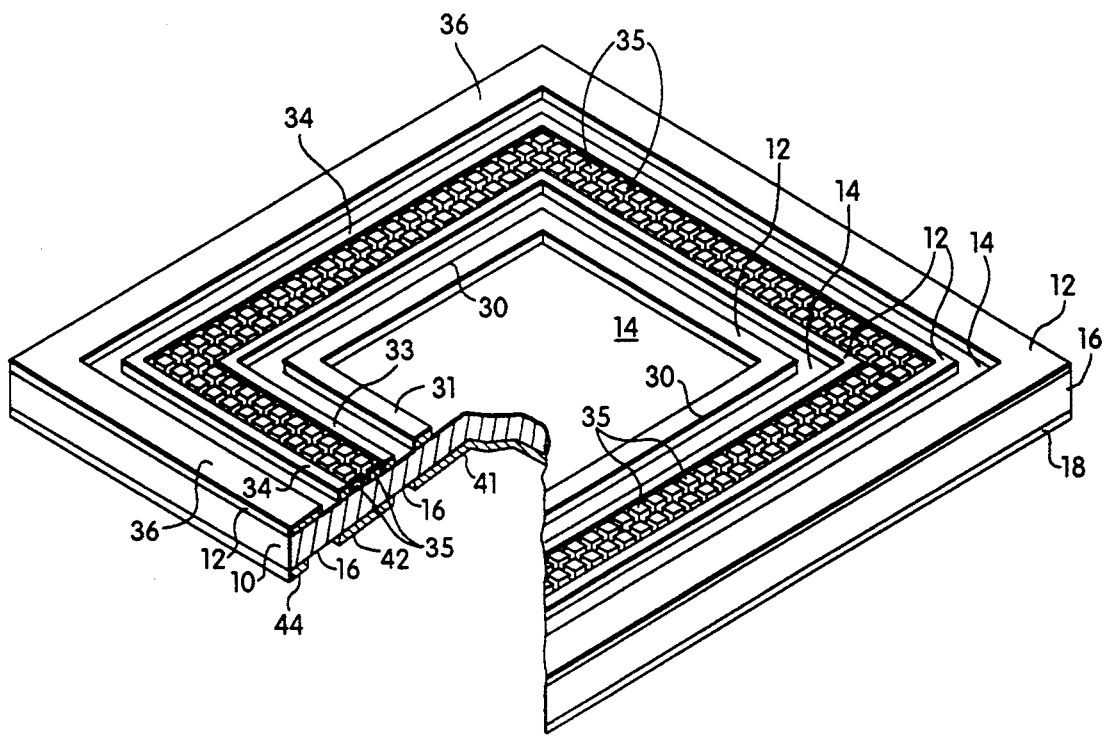

Between the inner perimeter portion 33 and the outer perimeter portion 34 of the second perimeter spacer are multiple medial electrically insulating cavity area spacer segments 35. The exact number and configuration of the medial support segments is not critical. In the preferred embodiment illustrated, as best seen in FIG. 3B, the medial segments are stand-alone, rectilinear posts or pillars formed from the original electrically insulating layer 12 and, therefore, being of identical height as the continuous strips 31, 33 and 34. Alternatively, the medial spacer segments could be unitary with the perimeter spacer segments 33 and 34. In fact, those skilled in the art will understand from this disclosure that the multiple medial spacer segments in the second cavity may comprise any of numerous configurations. They may be multiple stand-alone pillars of square or other cross-sections. They may alternatively be joined to form one or more larger medial members within the cavity, for example a serpentine spacer segment. Preferably, the volume of the second cavity, not including the volume of the medial spacer segments, is the same as the volume of the first cavity. Since the internal height of the cavity in preferred embodiments is uniform and equal in the two cavities, equal cavity areas will yield equal cavity volumes. Numerous alternative configurations will be readily apparent to those skilled in the art in view of the present disclosure. As described further below, the medial support segments will, in the finished article, render the second sensor transducer means substantially resistant to the applied force, such as pressure, acceleration etc., which substantially effects the capacitance of the first transducer by deflecting the first cavity. The second transducer means can be used, therefore, as a reference transducer, with the first transducer means being used as a primary transducer. In preferred embodiments, such integral reference transducer can reduce sensitivity to thermal effects and perhaps even eliminate the need for calibration trimming in certain applications.

In addition to the two capacitor structures described above, the masked etching of electrically insulating layer 12 further defines a substrate support spacer 36 comprising a rectilinear, continuous perimeter strip of electrically insulating material concentric with the two capacitor structures to serve as part of a substrate support means. As discussed further below, the substrate support spacer 36 provides a third electrically isolated node in the capacitive transducer article. The substrate support means may be any such structure, located preferably as a peripheral support radially outward of the first and second cavity structures. It may be electrically non-conductive, but in more preferred embodiments provides a metalization layer in electrical contact with the upper surface 26 of doped silicon substrate wafer 20, forming the aforesaid third electrical node of the capacitance transducer article.

It should be understood that the term capacitance transducer article is intended to include not only fully functional capacitance transducers, mounted perhaps on a circuit board or the like in electrical connection with associated circuitry, but also components of intermediate fabrication having the essential features of the invention, most notably the integral second cavity with multiple medial electrically insulating cavity area spacer segments.

As indicated above, the silicon nitride layer 18 on the upper surface 16 of silicon wafer 10 is also selectively etched. As best seen in FIG. 3A, the etched pattern leaves a central portion 41 corresponding to the first cavity structure 30, having its outer edge aligned over the outer edge of electrically insulating cavity perimeter spacer 31 on the lower surface 14 of wafer 10. Similarly, a second portion 42 is aligned over cavity structure 32. A third portion 44 is aligned over substrate support spacer 36, being less wide (i.e., having a smaller radial dimension) than support spacer 36.

The two wafers 10, 20 are then stuck together in a wet oxygen environment and immediately placed in a conventional furnace, typically at 850° C. to 1000° C. for about 30 minutes to form a bonded assembly 45. (See FIG. 4) Alternatively, it may be more convenient to use a rapid thermal annealer to reduce the processing time. For example, exposure in a rapid thermal annealer employing radiant heat lamps to produce temperatures of 1000° C. to 1100° C. for 30 seconds may be sufficient to bond the wafers together, followed by transfer to the conventional furnace to complete reaction of the original wet oxygen atmosphere. Without wishing to be bound by theory, it is presently understood that the pumping action of the oxidation of the bare doped silicon surfaces in the capacitor cavities results in a clamping force which enhances the bonding process. That is, oxygen reacts with silicon to form $SiO_x$, producing at least partial vacuum which creates clamping force during the chemical bonding of the surfaces of the two wafers.

As best seen in FIG. 4, bonding the second wafer to the first wafer forms two hermetically sealed cavities, specifically, a first capacitor cavity 47 and a second capacitor cavity 49. The first capacitor cavity 47 in the center of the bonded assembly 45 will flex under pressure causing the gap and therefore capacitance of the finished capacitance transducer to change. The second capacitor cavity 49, however, has a "parking garage" geometry, that is, it has multiple medial spacer segments of electrically insulating material (formed from original electrically insulating layer 12) within the second cavity area. Such medial spacer segments resist deflection of the second cavity, rendering it resistant to changes in capacitance as a result of the aforesaid applied pressure.

Figure 6:
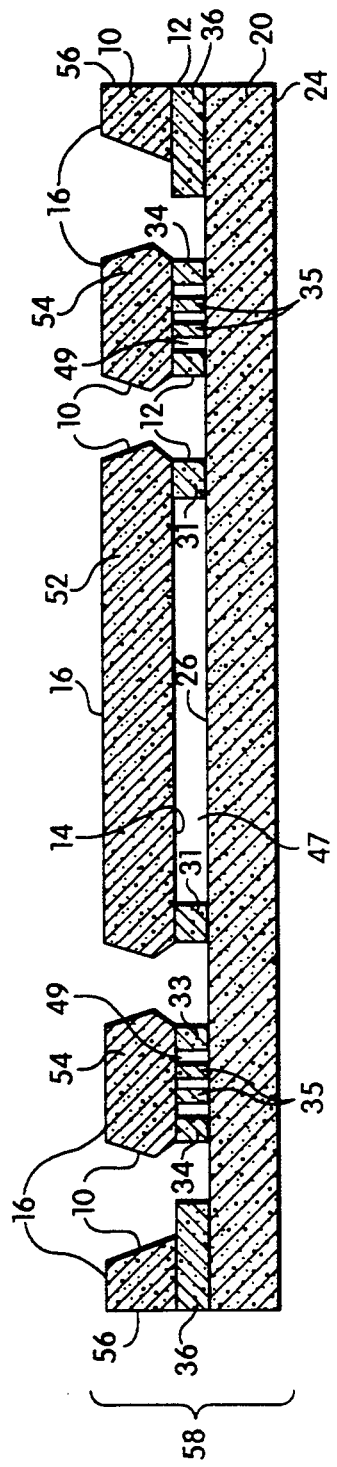

The bonded assembly then is anisotropically etched, for example, in potassium hydroxide or other suitable anisotropic etching solution, until doped silicon wafer 10 is etched through. The above described portions 41, 42 and 44 formed of original layer 18 on upper surface 16 of wafer 10 protect corresponding portions of wafer 10 during the anisotropic etching to produce the etched structure 50 best seen in FIG. 5. Anisotropic etching results in square rather than round transducer elements and slight over-etching of the convex corners may be desirable to reduce stray capacitance in certain applications. The anisotropic etching forms a first doped silicon member 52, associated with protective film portion 41, over capacitance cavity 47 in a first sensor transducer means. A second doped silicon member 54 is formed by portion 42 over second capacitance cavity 49 as part of a second sensor transducer means. A third doped silicon member 56 is formed by protective film portion 44 to provide a substrate support means in the finished capacitance transducer article, as further discussed below. The protective film portions 41, 42 and 44, as well as protective coating 25 on the lower surface of doped silicon wafer 20 are then removed, for example by plasma etching. The resultant post-etched assembly 58 is illustrated in FIG. 6. Plasma etching is preferred since, unlike certain wet etching methods, it can be carried out without etching away the spacer segments of the assembly.

Figure 7:
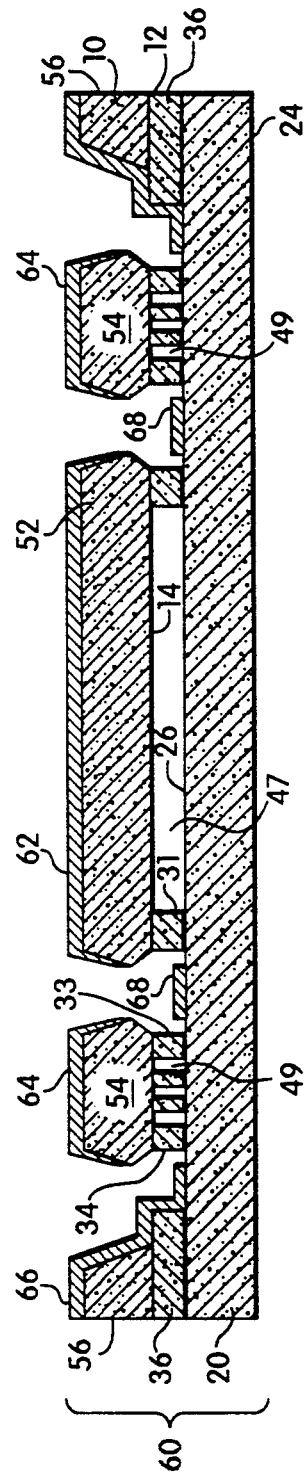

A metalized assembly 60 is then formed by depositing a blanket metalization layer onto the post-etch assembly 58. The blanket metalization layer preferably is aluminum, although suitable refractory metal may be used, a gold over chromium metal layer or the like. Deposition preferably is carried out by evaporation, to achieve line-of-sight deposition. It should be noted in this regard that the side surfaces of the doped silicon members 52 and 54 are convex, such that they overhang the surface 26 of doped silicon wafer 20 immediately adjacent their corresponding spacer segments 31, 33 and 34. As a result, the metalized capacitor elements are left electrically isolated from each other, as they are from the metalization layer on the substrate support member 56. Such overshadowing of the surface 26 of lower wafer 20, which forms a common substrate for the two sensor transducer means of the capacitance transducer article, whereby the various metalization layers 62, 64, 66 and 68 are isolated from each other, avoids shorting out the top plate to the bottom plate of the article. The beveled or concave configuration of the side surfaces of the doped silicon members results naturally during the anisotropic etching step. Referring particularly to FIG. 7, the metalized assembly is seen to comprise metalization layer 62 on doped silicon member 52 which forms first capacitance cavity 47. Similarly, metalization layer 64 is seen on doped silicon member 54 of capacitance cavity 59. Metalization layer 66 is seen on substrate support member 56. Metalization layer 68 is electrically isolated from the other metalization layers. Thus, three electrical nodes, each electrically isolated from the other, are formed.

The capacitance transducer article may be used or "packaged" in any suitable manner, numerous alternatives being well known to those skilled in the art. Wire bonds, for example, may be attached in any convenient manner to the three electrical nodes of the article. In one preferred application, solder bumps are electroplated onto the blanket metalization layers. Solder bumps formed of lead/tin solder, in thicknesses of about 20 to 30 mils, are suitable for capacitance transducer articles intended for use in numerous routine applications. Often an intermediate diffusion layer, such as a 10% tungsten in titanium layer, is deposited onto the metalization layers before the solder. The intermediate diffusion layer serves to protect the aluminum or other metalization layer material from the solder. It can be deposited, for example, by evaporation for the same reason that evaporative deposition was used in depositing the metalization layer. Generally, an intermediate diffusion layer 0.2 to 0.5 microns thick is suitable. Such diffusion generally is unnecessary with metalization layers of gold over chromium and the like.

Figure 8:
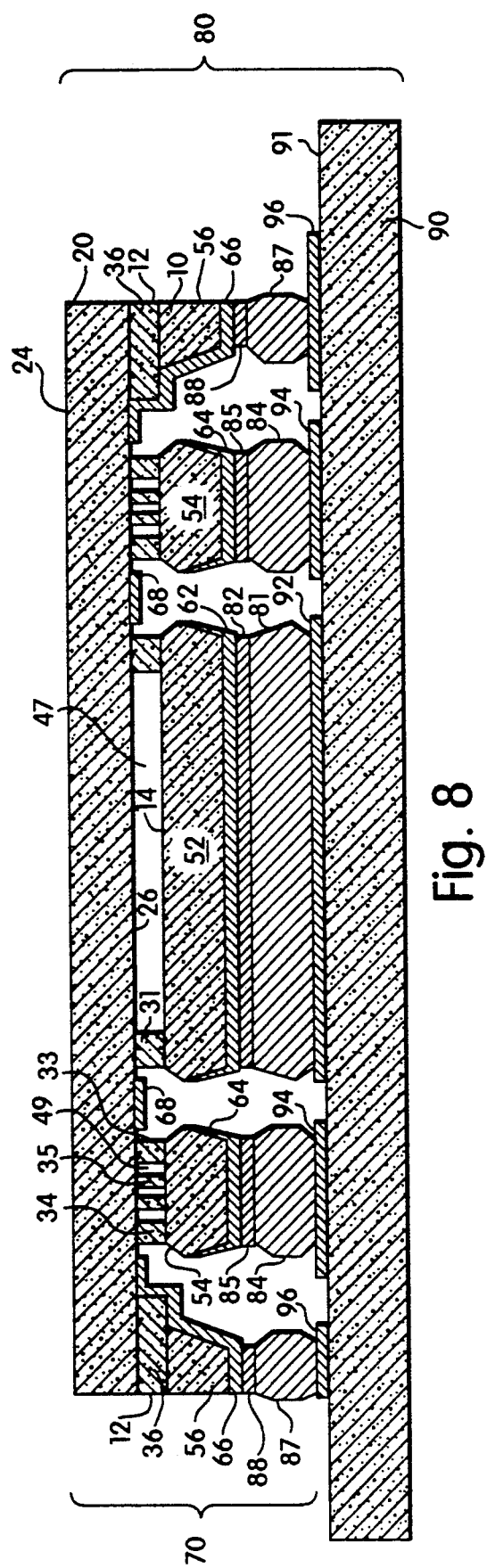
FIG. 8 is a cross-sectional side elevation view of the capacitive transducer article of FIG. 7 mounted to a base member in accordance with a preferred embodiment of the invention.

The solder bumps can be selectively electroplated onto the metalization surfaces by well known techniques including, for example, photolithographic methods. Solder bump mounting of the capacitance transducer article is particularly suitable, for example, for application as a manifold pressure transducer in the internal combustion engine of a motor vehicle, in view of its robust electrical and mechanical connections to a suitable base member, as illustrated in FIG. 8. Additional automotive uses for capacitance transducer articles of the invention include fuel tank pressure transducers, automatic transmission fluid pressure transducers and the like. Capacitance transducer articles in accordance with such preferred embodiments also are suitable for barometric pressure sensors.

Figure 9:
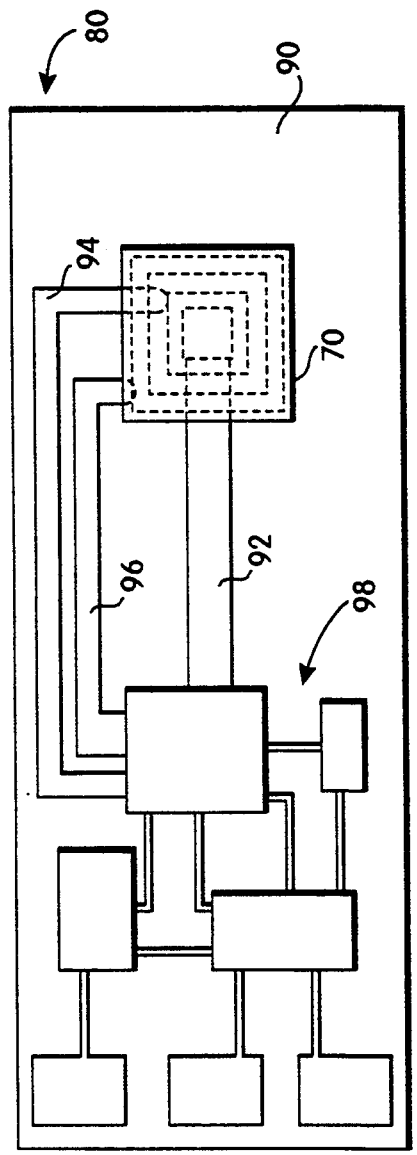
FIG. 9 is a plan view of the mounted capacitive transducer article of FIG. 8.

Referring specifically to the mounted assembly 80 in FIGS. 8 and 9, a first solder bump 81 is electroplated onto the blanket metalization layer 62 with an intermediate diffusion layer 82 between them. Thus, solder bump 81 provides solid support for doped silicon member 52 under cavity 47. (The capacitance transducer article has been inverted in FIGS. 8 and 9 versus its orientation in FIGS. 1–7.) Similarly, a second solder bump 84 with intermediate diffusion layer 85 is provided for doped silicon member 54 under the second, reference sensor transducer means comprising capacitance cavity 49. A third solder bump 87 and corresponding third intermediate diffusion layer 88 provide support under substrate support member 56 and its corresponding metalization layer 66 at the outer perimeter of the capacitance transducer article.

The capacitance transducer article is mounted on base member 90, a patterned thick-film coated substrate. Base member 90 may be any of several well known and commercially available materials including, for example, alumina, which is most typical, or enameled steel plate, Pyrex, etc. It should be a material suitable to withstand the temperatures encountered during solder flow operations. Base member 90 carries on its upper surface 91 three electrically conductive thick film leads. First lead 92 underlies and is in electrical contact with solder bump 81. Thus, lead 92 provides electrical connection between the first sensor transducer means and supporting signal conditioning electronic circuitry means 98 also mounted on surface 91 of base member 90. Such signal processing circuitry means may include, for example, switch capacitor electronics to detect changes in capacitance, analog or digital signal amplifying devices, and the like. Similarly, electrical lead 94 underlies and is in electrical connection with solder bump 84, thereby providing electrical connection between circuitry 98 and the second sensor transducer means. Third electrical lead 96 underlies and is in electrical contact with third solder bump 87, thereby providing electrical connection between circuitry 98 and the upper surface of doped silicon substrate wafer 20 via the third electrical node of the capacitance transducer article, comprising the metalization layer 66 on the substrate support member 56. Such thick film leads can be formed on suitable substrate materials, for example, by silk screening a thick film ink filled with gold, silver or other suitable metal powder and fired. Typically, the thick film electrical leads are a few mils thick.

In many applications, the capacitance transducer articles will be sufficiently small that numerous identical units can be produced from a single pair of doped silicon wafers. For many typical applications, a standard 4-inch doped silicon wafer could yield potentially several hundred individual capacitance transducer articles corresponding to the embodiments described herein. Routine methods for dicing such wafer into individual components include, for example, the use of diamond saw cutting means. The soldered assembly 70 illustrated in FIG. 8 may, therefore, be one of numerous identical units. The wafers are diced to produce individual sensors which then may be mounted, for example on patterned thick-film coated substrates, to produce mounted assembly 80. The solder bumps would provide the backing support for the pressure sensor chip so that only the doped silicon substrate formed from original layer 20 would deflect under an applied pressure or other force. As noted above, of course, the medial spacer segments 35 in the second cavity 49 would resist deflection of the substrate over that second cavity.

While certain presently preferred features and embodiments have been described above in detail, it will be understood by those skilled in the art in view of the present disclosure that various changes and modifications may be made without departing from the true scope of the invention. Accordingly, the claims which follow are intended to cover all such changes and modifications.

We claim:
1. A capacitance transducer article comprising:
a first sensor transducer means for responding to an applied force, and environmental conditions, having an hermetically sealed first cavity formed by a first doped silicon member having an upper surface and an electrically conductive lower surface,
a first region of an electrically conductive upper surface of a doped silicon substrate, being substantially parallel to, and spaced a distance from, the lower surface of the first doped silicon member, and a first electrically insulating cavity perimeter spacer of predetermined thickness between the lower surface of the first doped silicon member and the first region of the upper surface of the doped silicon substrate,
said first doped silicone member being deformable in response to the applied force to vary the distance between the electrically conductive lower surface of the first doped silicone member and the first region of the electrically conductive upper surface of the doped silicone substrate; and
second sensor transducer means for responding to said environmental conditions, being less responsive to the applied force, having an hermetically sealed second cavity coplanar with the first cavity, formed by a second doped silicon member having an upper surface and a lower surface, a second region of the electrically conductive upper surface of the doped silicon substrate, a second electrically insulating cavity perimeter spacer of said predetermined thickness between the lower surface of the second doped silicon member and the second region of the upper surface of the doped silicon substrate, and multiple medial electrically insulating cavity area spacer segments within the second cavity to resist deformation thereof in response to said applied force.

2. The capacitance transducer article of claim 1 further comprising a first electrically conductive film on the upper surface of the first doped silicon member, and a second electrically conductive film on the upper surface of the second doped silicon member, the first electrically conductive film not being electrically shorted to the second electrically conductive film.

3. The capacitance transducer article of claim 1 wherein the first cavity and the second cavity are substantially concentric.

4. The capacitance transducer article of claim 1 further comprising signal means for converting deformation of the first cavity in response to said environmental conditions into an electrical signal corresponding to the magnitude of the applied force.

5. The capacitance transducer article of claim 1 wherein the first and second electrically insulating cavity perimeter spacers and the multiple medial electrically insulating cavity area spacer segments are formed of silicon dioxide.

6. The capacitance transducer article of claim 1 wherein the first cavity is substantially concentric with the second cavity and is of equal area and cavity volume.

7. The capacitance transducer article of claim 1 wherein the first doped silicon member and the second doped silicon member are mounted on a surface of a base member in electrical connection with signal means for generating an electrical signal in response to deformation of the first cavity, the first sensor transducer means being electrically connected to a first electrically conductive lead on the surface of the base member, by a first metal film on the upper surface of the first doped silicon member and a first solder support spacer mediate the first metal film and the base member, and the second sensor transducer means being electrically connected to a second electrically conductive lead on the surface of the base member by a second metal film on the upper surface of the second doped silicon member and a second solder support spacer mediate the second metal film and the base member.

8. The capacitance transducer article of claim 7 further comprising a substrate support between the periphery of the doped silicon substrate and the base member, providing electrical connection between the upper surface of the doped silicon substrate and a third electrically conductive lead on the surface of the base member.

9. The capacitance transducer article of claim 1 wherein the first and second doped silicon members and the doped silicon substrate are substantially uniformly doped throughout at about $10^{17}$ per cc to $10^{19}$ per cc dopant level.

10. The capacitance transducer article of claim 1 wherein the first doped silicon member and the second doped silicon member are uniformly spaced from the doped silicon substrate 2 to 5 microns by said predetermined thickness of the first and second electrically insulating cavity perimeter spacers, respectively.

11. A capacitance pressure transducer comprising:
a base member comprising a surface and electrically conductive leads extending along the surface; and
a capacitance transducer article mounted on the surface of the base member in electrical contact with the leads, the capacitance transducer comprising:
  a doped silicon substrate having an exposed lower surface, an electrically conductive upper surface and an outer perimeter;
  a generally planar first doped silicon member having a lower surface, an upper surface and a generally square perimeter, lying in a plane generally parallel to the doped silicon substrate and being spaced from, and bonded to, the upper surface of the doped silicon substrate by a first electrically insulating cavity perimeter spacer at the perimeter of the first doped silicon member between the lower surface of the first doped silicon member and the upper surface of the doped silicon substrate, the lower surface of the first doped silicon member together with the upper surface of the doped silicon substrate and the first electrically insulating cavity perimeter spacer forming a hermetically sealed first cavity adapted to deform in response to applied pressure;
  a first electrically conductive layer on the upper surface of the first doped silicon member;
  a first solder spacer between, and electrically interconnecting, the first electrically conductive layer and a corresponding one of the electrically conductive leads;
  a second doped silicon member substantially coplanar with the first doped silicon member, extending continuously around the first doped silicon member, having an inside perimeter facing and spaced from the perimeter of the first doped silicon member, an outside perimeter, a lower surface and an upper surface, and being spaced from and bonded to the upper surface of the doped silicon substrate by (a) a second electrically insulating cavity perimeter spacer at its inside perimeter, and (b) a third electrically insulating cavity perimeter spacer at its outside perimeter, a hermetically sealed second cavity being formed by the lower surface of the second doped silicon member, the upper surface of the doped silicon substrate and the second and third electrically insulating cavity perimeter spacers, and (c) multiple medial electrically insulating cavity area spacers extending within the second cavity from the upper surface of the doped silicon substrate to the lower surface of the second doped silicon member to resist deformation thereof in response to said applied pressure;
  a second electrically conductive layer on the upper surface of the second doped silicon member, not being electrically shorted to the first electrically conductive layer;
  a second solder spacer between, and electrically interconnecting, the second electrically conductive layer and a corresponding one of the electrically conductive leads;
  a third doped silicon member substantially coplanar with the first and second doped silicon members, extending around the second doped silicon member at the perimeter of the doped silicon substrate, having an inside perimeter facing and spaced from the outside perimeter of the second doped silicon member, a lower surface and an upper surface, and being spaced from and bonded to the upper surface of the doped silicon substrate by a fourth electrically insulating spacer substantially coplanar with the first, second and third electrically insulating cavity perimeter spacers and the medial electrically insulating cavity area spacers;
  a third electrically conductive layer on the upper surface of the third doped silicon member, being not electrically shorted to the first or second electrically conductive layers; and
  a third solder spacer between, and electrically interconnecting, the third electrically conductive layer and a corresponding one of the electrically conductive leads.

12. The capacitance transducer article of claim 11 further comprising signal means mounted to the base member in electrical contact with corresponding ones of the electrically conductive leads for converting deformation of the first cavity in response to the applied pressure into an electrical signal.

13. The capacitance transducer article of claim 11 wherein the base member is formed of material selected from the group consisting of alumina, glass and enamel coated metal.

* * * * *